Patented Oct. 30, 1962

1

3,061,645
TRIFLUOROMETHYL THIO COMPOUNDS
James B. Buchanan and Walter A. Gregory, Wilmington, Del., assignors to E. I. du Pont de Nemours and Company, Wilmington, Del., a corporation of Delaware
No Drawing. Filed Jan. 23, 1959, Ser. No. 788,499
2 Claims. (Cl. 260—599)

This invention relates to p-(trifluoromethylthio)-benzaldehyde and to its preparation.

This compound can be represented by the formula:

(1) 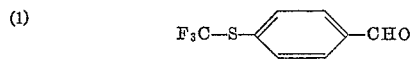

and can be prepared from previously known materials by novel methods which we have discovered. These methods involve the preparation of a number of new intermediate organic compounds.

In accordance with this invention, using as a starting material p-(methylthio)benzaldehyde, a known compound described in U.S. Patent 2,761,873, some of our methods for the production of the compound of Formula 1 can be diagrammatically represented as follows:

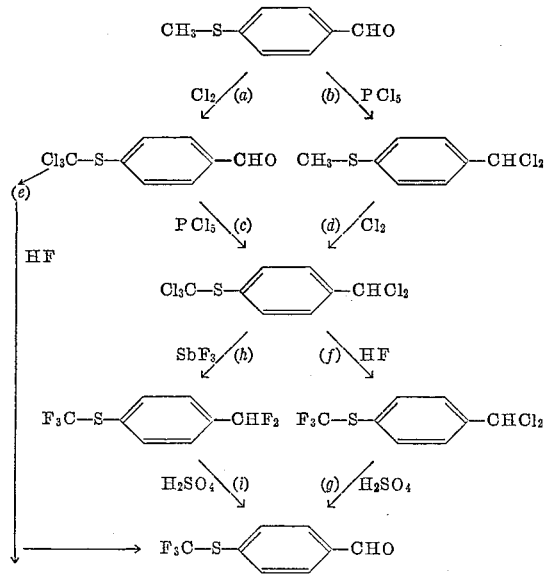

Various alternative procedures will be apparent from an insepction of the above diagram. Thus, one route of synthesis involves steps (a) and (e); a different route involves steps (a), (c), (f) and (g); a third route involves (b), (d), (f), and (g); a fourth route involves steps (b), (d), (h) and (i). The choice of one of these routes will depend on a number of factors, such as the amount of material to be produced, the equipment available, the economics of the particular situation, etc. The preferred route is

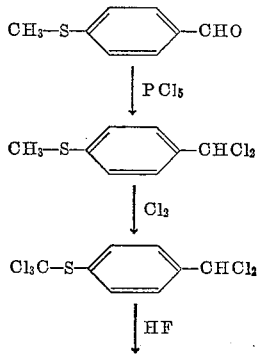

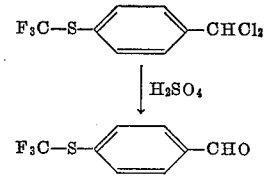

With reference to the above diagram, it will be seen that the known p-(methylthio)benzaldehyde is converted to the novel alpha,alpha-dichloro-p-tolyl trichloromethyl sulfide by either of two methods. Thionyl chloride can be used instead of phosphorus pentachloride, if desired.

The alpha,alpha-dichloro-p-tolyl trichloromethyl sulfide is reacted with three equivalents or slightly more of hydrogen fluoride, in a pressure vessel, at an elevated temperature of about 100° C., and preferably between 80° and 200° C., to form the novel trifluoromethylthio derivative, which is then readily converted to the desired aldehyde of Formula 1 by reaction with sulfuric acid, preferably at a temperature within the range from about 20° to 50° C.

The conversion of alpha,alpha-dichloro-p-tolyl trichloromethyl sulfide to the trifluoromethyl compound is carried out by heating at atmospheric pressure with antimony trifluoride, with an antimony pentahalide, with antimony trifluoride mixed with an antimony pentahalide, or with antimony trifluoride mixed wtih hydrogen fluoride.

Alternatively, as can be seen by step (e) in the above diagram, the novel p-(trichloromethylthio)benzaldehyde is converted directly to the compound of Formula 1 by reaction with HF or SbF₃ or similar fluorinating reagent.

Steps (a) and (d) shown above can be carried out with or without a solvent. Solvents such as methylene chloride, chloroform, carbon tetrachloride, tetrachloroethane, benzene, pentane, hexane, chlorobenzene or toluene, to name a few, may be used. The reaction can be carried out between 30° C. and 100° C., but it is best carried out between 0° C. and 50° C.

Steps (b) and (c) shown above can likewise be carried out with or without a solvent. Any solvent unreactive with phosphorus pentachloride may be employed. Carbon tetrachloride, methylene chloride, benzene, hexane, pentane or chloroform are suitable. The reaction is exothermic, and can be carried out from 20° C. to 200° C., but is conveniently carried out at 0° C. to 50° C.

Step (f) is carried out by heating the alpha,alpha-dichloro-p-tolyl trichloromethyl sulfide in three moles of liquid hydrogen fluoride in a bomb between 50° to 130° C. for ½ to 3 hours. The reaction will go at atmospheric pressure by cooling hydrogen fluoride to the compound over a long period of time (48 to 100 hours). In the process at atmospheric pressure one chlorine is exchanged at a time and it is possible to isolate the intermediate compounds:

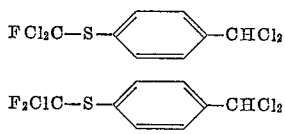

Step (f) may alternatively be carried out by heating alpha,alpha-dichloro-p-tolyl trichloromethyl sulfide at atmospheric pressure with a mole of antimony trifluoride. A pentavalent antimony salt may if desired be used as a catalyst. This reaction can be carried out without a solvent, but an inert solvent such as chlorobenzene, nitrobenzene, toluene, xylene or tetrachloroethane may be used. The temperature of the reaction is from 50° C. to 200° C.

Step (h) is carried out as outlined above for (f) with antimony trifluoride but in this case, 1⅔ moles to 2 moles of SbF₃ is used for each mole of alpha,alpha-dichloro-p-tolyl trichloromethyl sulfide.

Step (e) is carried out as indicated for step (f) but starting with p-(trichloromethylthio)benzaldehyde.

Step (g) is readily carried out by stirring alpha,alpha-dichloro-p-tolyl trifluoromethyl sulfide with 1 to 6 parts of concentrated sulfuric acid at ambient temperature. The range of temperature is from 0° to 100° C.

Step (i) is like step (g) except that the alpha,alpha-difluoro-p-tolyl trifluoromethyl sulfide is reacted with the sulfuric acid at higher temperature (50° to 100° C.).

In a new and related process, the novel alpha,alpha-dichloro-p-tolyl trifluoromethyl sulfide is reacted with an oxidizing agent, such as peracetic acid, chromic acid, acidic potassium permanganate, or the like, to form another useful compound identified as alpha,alpha-dichloro-p-tolyl trifluoromethyl sulfone. This process is illustrated by the equation:

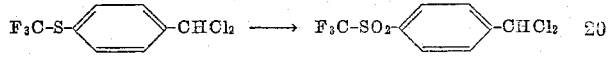

The compounds of the present invention are useful in the preparation of other organic compounds. Some of them are also useful in the control of the growth of microorganisms and are fungicidal and nematocidal agents. The compound of Formula 1 is particularly useful as a substituted benzaldehyde in the processes shown in U.S. Patent 2,816,915 for the preparation of certain phenylamidopropanediols known to have useful bactericidal properties and to be especially useful in the control of rickettsial infections. The novel alpha,alpha-dichloro-p-tolyl trifluoromethyl sulfone is a particularly useful intermediate which can be readily reacted with sulfuric acid at elevated temperatures on the order of 50° to 100° C. to provide good yields of the known compound p-(trifluoromethylsulfonyl)benzaldehyde, disclosed as a useful material in the aforementioned U.S. Patent 2,816,915. This process is illustrated as follows:

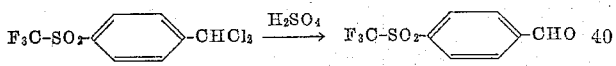

The invention will be further illustrated but is not intended to be limited by the following examples illustrating the novel compounds and methods of preparation:

EXAMPLE 1

*Alpha,Alpha-Dichloro-p-Tolyl Trichloromethyl Sulfide*

A suspension of 1647 g. (7.9 moles) of phosphorus pentachloride in 1500 cc. of carbon tetrachloride is stirred in a 5 l. R.B. flask equipped with a dropping funnel, thermometer and a condenser and drying tube. The addition of 1072 g. (7.04 moles) of p-(methylthio)benzaldehyde is started at a temperature of 24° C. The temperature rises to 30° C. and cooling is applied to keep the temperature between 25–30° C. The addition requires about 32 minutes. The PCl₅ goes into solution during this time, except for a few small lumps. The mixture is stirred an additional 30 minutes and the solution is complete. A 5 ml. sample is removed and concentrated under reduced pressure. The crystalline residue is recrystallized from pentane to give 0.3 g. of pale yellow crystals melting 46–47° C. This is alpha,alpha-dichloro-p-tolyl methyl sulfide.

A gas inlet tube dipping beneath the surface is placed in the flask and chlorine bubbled into the solution. Cooling is applied to keep the temperature 20–25° C. A voluminous evolution of hydrogen chloride takes place. A total of 1726 g. (20.31 moles) of chlorine is added over 4 hrs., 26 minutes. There is free chlorine in the solution. The solution is then sparged with nitrogen and warmed with a water bath until the excess chlorine is removed, and the remaining solution is then concentrated on a water pump. A considerable amount of PCl₅ sublimes to the upper part of the apparatus. The residue is poured into 4 l. of ice and water and 1.5 l. of methylene chloride added to dissolve the product which crystallizes. The methylene chloride layer is separated, and the water extracted with 500 cc. of methylene chloride. The combined extracts are dried over magnesium sulfate and concentrated, leaving 2214 g. of yellow oil which solidifies.

A 5 g. sample is recrystallized from pentane to give 2.4 g., M.P. 56.5–57° C.

EXAMPLE 2

*Alpha,Alpha-Dichloro-p-Tolyl Trifluoromethyl Sulfide*

A one liter Hastelloy B bomb is charged with 627 g. of alpha,alpha-dichloro-p-tolyl trichloromethyl sulfide, and after pumping the air from the bomb it is charged with 135 g. of hydrogen fluoride. The bomb is heated to 100° C. for 1 hour, cooled in a dry ice bath, and the hydrogen chloride slowly bled from the bomb. After the pressure is released, the contents of the bomb are transferred to a polyethylene bottle, and the bomb washed out with methylene chloride and this combined with the contents of the bottle. This is stirred with a "Teflon"-coated stirring bar on a magnetic stirrer and powdered calcium carbonate added slowly to prevent excessive foaming. When all of the HF and HCl have been neutralized, the liquid is filtered.

The combined filtrates from three runs are flash distilled at 0.2 mm. pressure through a short Vigreux column. A yield of 733 g. of product is obtained, B.P. 63–67° C., $n_D^{25} = 1.5158$.

EXAMPLE 3

*Alpha,Alpha-Dichloro-p-Tolyl Trifluoromethyl Sulfide*

A 310 g. (0.783 mole) portion of alpha,alpha-dichloro-p-tolyl trichloromethyl sulfide is melted and added to 200 g. of antimony trifluoride in a 2 l. R.B. flask equipped with thermometer, stirrer and condenser. The mixture is heated to 122° C. and the temperature held between 115–125° for 1¼ hrs. This is then poured into 2 l. of 6 N HCl containing some ice. The product is extracted with methylene chloride, dried over magnesium sulfate and concentrated at 10 mm. pressure. The product is distilled at 8 mm. pressure through a short Vigreux column. The yield is 101 g. of colorless oil $n_D^{25} = 1.5187$. This product contains two main constituents, with a third lesser component. The main fraction is the desired

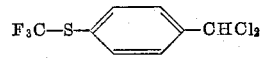

The next fraction is

This mixture is hydrolyzed by stirring with 200 cc. of conc. sulfuric acid at 25–30° C. for 1 hr. The solution is poured upon 2 l. of ice and water, and the solid extracted with methylene chloride, to give 83 g. of residue, which is distilled at 8 mm. pressure through an 18" spinning band column to give 58 g. of p-(trifluoromethylthio)benzaldehyde. This product on vapor chromatographic analysis proves to be better than 95% pure.

EXAMPLE 4

*Alpha,Alpha-Dichloro-p-Tolyl Trifluoromethylsulfone*

A solution of 175 g. (0.673 mole) of alpha,alpha-dichloro-p-tolyl trifluoromethyl sulfide in 175 cc. of glacial acetic acid is stirred in a R.B. flask equipped with a thermometer, dropping funnel and condenser. The flask is heated on a steam bath to 80° C. and 265 g. of 40% peracetic acid is added slowly. The heat is removed and the temperature maintained at 80–90° by controlling rate of addition of the peracetic acid. The first half of the oxidation is quite exothermic, but heating may be necessary for the second half of the oxidation.

After all of the peracetic acid is added, the temperature is held at 90° C. for 1½ hours. The total reaction time is three hours. The mixture is cooled to room temperature, poured into 1 l. of ice and water and extracted with methylene chloride. The methylene chloride extract is back washed with sat. sodium bicarbonate until neutral, dried over magnesium sulfate, and concentrated. The product is distilled at 9 mm. and the fraction boiling 139–148° amounts to 173 g., $n_D^{25}=1.5093$.

EXAMPLE 5 p-(Trifluoromethylthio)Benzaldehyde

A mixture of 50 g. (0.192 mole) of alpha,alpha-dichloro-p-tolyl trifluoromethyl sulfide and 100 cc. of conc. sulfuric acid is stirred at room temperature in a R.B. flask equipped with a thermometer and condenser. The temperature drops and a vigorous evolution of hydrogen chloride takes place. The solution turns orange-red. After 2 hrs., the acid is poured into 1 l. of ice and water and a white solid separates. This is extracted with methylene chloride, dried over magnesium sulfate and concentrated under reduced pressure. The product is distilled through a Vigreux column at 8–10 mm. pressure, and boiled at 83 to 85°. The yield is 33.4 g. of a white solid, M.P. 27–28° C.

EXAMPLE 6 p-(Trifluoromethylsulfonyl)Benzaldehyde

A mixture of 168 g. (0.575 mole) of alpha,alpha-dichloro-p-tolyl trifluoromethylsulfone and 340 cc. of conc. sulfuric acid is stirred in a R.B. flask equipped with a thermometer and condenser. The flask is heated on a steam bath to 86° C., when HCl is evolved. The temperature is raised to 95° C. for 1½ hours. The solution is then poured upon 2 l. of ice and water. The product separates as oil, which soon crystallizes. The solid is filtered, washed with water, then dissolved in methylene chloride, dried over magnesium sulfate, and concentrated. The product is distilled through a short Vigreux column at 9 mm. The fraction boiling at 124–131° C. amounts to 115 g., M.P. 39.5° to 41° C.

EXAMPLE 7 p-(Trichloromethylthio)Benzaldehyde

A solution of 100 g. (0.657 mole) of p-(methylthio)benzaldehyde in 500 cc. of carbon tetrachloride is stirred at 24–30° C. as 140 g. (1.97 mole) of chlorine is added over a three hour period. The solution is then sparged with nitrogen to remove the hydrogen chloride, and the carbon tetrachloride is removed by distillation under reduced pressure leaving 166 g. This is poured into 300 cc. of hexane and the product crystallized. This is filtered, washed with hexane and dried. There is obtained 103 g. of product, melting 73–75° C.

EXAMPLE 8

Alpha,Alpha-Dichloro-p-Tolyl Trichloromethyl Sulfide

A mixture of 103 g. (0.403 mole) of p-(trichloromethylthio)benzaldehyde and 84 g. (0.403 mole) of phosphorus pentachloride is prepared which rapidly turns liquid with evolution of heat. The reaction is controlled by cooling the mixture. After the reaction is complete, the phosphorus oxychloride is distilled off under reduced pressure. The oil that remains is poured into 1 l. of ice and water. The crystalline product is filtered, washed with water and dried. The yield is 125 g., M.P. 52–54° C. The product can be purified by crystallization from pentane.

The invention claimed is:
1. A compound of the formula

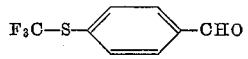

2. A compound of the formula

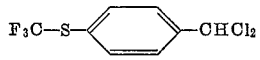

References Cited in the file of this patent

UNITED STATES PATENTS

| | | |
|---|---|---|
| 2,180,772 | Scherer | Nov. 21, 1939 |
| 2,761,873 | Gregory et al. | Sept. 4, 1956 |
| 2,763,692 | Gregory | Sept. 18, 1956 |
| 2,776,992 | Gregory | Jan. 8, 1957 |
| 2,816,915 | Gregory | Dec. 17, 1957 |

OTHER REFERENCES

Wagner et al.: Synthetic Organic Chemistry (1953), p. 105.

University of North Carolina, Organic Fluorine Compounds (received by Library Oct. 2, 1950), p. 277. (Copies in Library.)